(12) United States Patent
Odani et al.

(10) Patent No.: US 6,558,793 B2
(45) Date of Patent: May 6, 2003

(54) SUBSTRATE FIBER OF A DRY FRICTION MATERIAL AND MANUFACTURING METHOD THEREOF, AND A DRY FRICTION MATERIAL

(75) Inventors: Naoki Odani, Nagoya (JP); Masaaki Kobayashi, Tokoname (JP); Kenji Kakihara, Nagoya (JP); Tunehisa Kawade, Nishikamo-gun (JP)

(73) Assignees: Aisin Seiki Kabushiki Kaisha, Kariya (JP); Aisin Kako Kabushiki Kaisha, Nishikamo-gun (JP)

( * ) Notice: Subject to any disclaimer, the term of this patent is extended or adjusted under 35 U.S.C. 154(b) by 0 days.

(21) Appl. No.: 09/997,013

(22) Filed: Nov. 30, 2001

(65) Prior Publication Data

US 2002/0182407 A1 Dec. 5, 2002

(30) Foreign Application Priority Data

Nov. 30, 2000 (JP) ........................................ 2000-365710

(51) Int. Cl.⁷ .................................................. D01F 6/00
(52) U.S. Cl. ........................ 428/364; 428/395; 428/399
(58) Field of Search ................................. 428/364, 395, 428/399; 264/21, 140; 162/9, 100

(56) References Cited

U.S. PATENT DOCUMENTS

| | | | | |
|---|---|---|---|---|
| 4,811,908 A | * | 3/1989 | Galati | 241/21 |
| 5,324,811 A | * | 6/1994 | You et al. | 528/336 |
| 5,707,905 A | | 1/1998 | Lam et al. | |
| 5,753,356 A | | 5/1998 | Lam et al. | |
| 5,856,244 A | | 1/1999 | Lam et al. | |
| 5,858,883 A | | 1/1999 | Lam et al. | |
| 5,998,307 A | | 12/1999 | Lam et al. | |
| 6,001,750 A | | 12/1999 | Lam | |
| 6,130,176 A | | 10/2000 | Lam | |

* cited by examiner

*Primary Examiner*—N. Edwards
(74) *Attorney, Agent, or Firm*—Oblon, Spivak, McClelland, Maier & Neustadt, P.C.

(57) ABSTRACT

A substrate fiber for a dry friction material includes a trunk portion extending in the axial direction of the fiber and divergent portions slightly diverged from a part of the trunk portion and having small diameters. The diameter of the trunk portion is from about 10 to 20 $\mu$m and the length of the trunk portion is from about 0.5 to 5 mm.

7 Claims, 5 Drawing Sheets

Size of composition materials
  ○ smaller than several $\mu$m
  ⊙ larger than several ten $\mu$m
  ▨ others Size of composition materials
- ○ smaller than several μm
- ⊙ larger than several ten μm
- ▨ others

SUBSTRATE FIBER OF A DRY FRICTION MATERIAL AND MANUFACTURING METHOD THEREOF, AND A DRY FRICTION MATERIAL

BACKGROUND OF THE INVENTION

1. Field of the Invention

This invention relates to a substrate fiber for a dry friction material, to a method of manufacturing the substrate fiber, and to a dry friction material. More particularly, the present invention relates to a substrate fiber that can stabilize the coefficient of friction ($\mu$) of dry friction material containing the substrate fiber, to a method of manufacturing the substrate fiber, and to a dry friction material containing the substrate fiber.

2. Discussion of the Background

A conventional dry friction material used in, e.g., a vehicular clutch or brake pad is manufactured by forming and heating a compounded mixture of substrate fiber, a variety of composition materials and thermosetting resins. In the past asbestos has been used as the substrate fiber. Recently, environmental and sanitation concerns have led to aramid fiber as an alternative substrate fiber material.

The engaging and disengaging point of a clutch and the deceleration caused by a brake pad are dependent on the performance of the dry friction material in the clutch and brake pad. Consistent clutching and braking requires that the dry friction material have a stable coefficient of friction ($\mu$). This requires that the substrate fiber and the variety of composition materials in the dry friction material be uniformly distributed throughout the dry friction material. This also requires that the uniform distribution of substrate fiber and composition materials be stable regardless of the frequency of engagement of the dry friction material in the clutch or brake.

FIG. 3 shows a dry friction material in which the substrate fiber consists of straight aramid fiber chops 20. However, the ability of straight cylindrical fiber chops 20 to hold composition materials 13 and 14 in the dry friction material is poor. As a result, the adhesion between the substrate fiber and the composition materials (e.g. metallic fiber and son) in the dry friction material is poor. In addition, because the chops 20 do not include divergent portions (e.g., fine fibers) extending from the fiber cylinders, the chops 20 are apt to cohere, so the dispersibility of the substrate fiber chops 20 is poor. As a result, when cylindrical fiber chops 20 are used to form dry friction material, great care must be taken in mixing the chops 20 with other composition materials if satisfactory dry friction material performance is to be achieved. For example, the type of mixer used, the nature of the mixed components, the order of mixing, and the frequency of mixing must all be considered. This makes the manufacture of dry friction material containing cylindrical substrate fiber chops 20 extremely difficult.

FIGS. 2 and 8 show one approach to avoiding the difficulties presented by cylindrical substrate fiber in forming dry friction material. In FIG. 2 a fiber pulp 10 comprises aramid fibers each having a trunk portion 11 with a diameter of about 0.1 to several $\mu$m and a length on the order of 2 mm. In this pulp 10 numerous divergent portions 12 with diameters on the order of nm to several $\mu$m diverge from the trunk portion 11. The divergent portions 12 enhance the dispersibility of the fiber pulp 10, so the fiber pulp 10 can be distributed uniformly. This makes it relatively easy to mix the fiber pulp 10 in a dry friction material.

However, the fiber pulp 10 can make it difficult to mix various other composition materials in a dry friction material. Composition material 13, which is smaller than several $\mu$m, can be distributed fairly uniformly in the small spaces left by the divergent portions 12 of the fiber pulp 10. However, composition material 14, which is larger than several tens of $\mu$m, cannot be distributed uniformly in the fiber pulp 10 and tends to cohere. As a result, dry friction materials containing fiber pulp 10 do not contain a uniform distribution of composition materials.

When dry friction material having a non-uniform distribution of substrate fibers and composition materials is used repeatedly, a large number of divergent portions which are diverged from the substrate fibers subsist and tend to appear at the periphery of the frictional surface of the dry friction material. As a result, the condition of the frictional surface changes in response to the frictional history and the coefficient of friction ($\mu$) of the surface becomes unstable.

SUMMARY OF THE INVENTION

The present invention provides an improved substrate fiber for a dry friction material that allows the substrate fiber and other composition materials in the dry friction material to be dispersed equally or uniformly in the dry friction material. Each substrate fiber includes a trunk portion extending in the axial direction of the fiber. The trunk portion fits within a maximum diameter of from about 10 to 20 $\mu$m. The length of the trunk portion is from about 0.5 to 5 mm. Slightly diverging from a part of the trunk portion is at least one divergent portion having a small diameter less than the maximum diameter. The divergent portions in the substrate fibers prevent the fibers from cohering, while allowing the substrate fiber and the composition materials to be uniformly dispersed in the dry friction material.

BRIEF DESCRIPTION OF THE DRAWINGS

The foregoing and additional features and characteristics of the present invention will become more apparent from the following detailed description considered with reference to the accompanying figures in which like reference numerals designate like elements and wherein.

DESCRIPTION OF THE PREFERRED EMBODIMENTS

The invention having been generally described, a further understanding of the invention can be obtained now according to an embodiment of the present invention with reference to figures in accompanying drawings.

Figure 1:
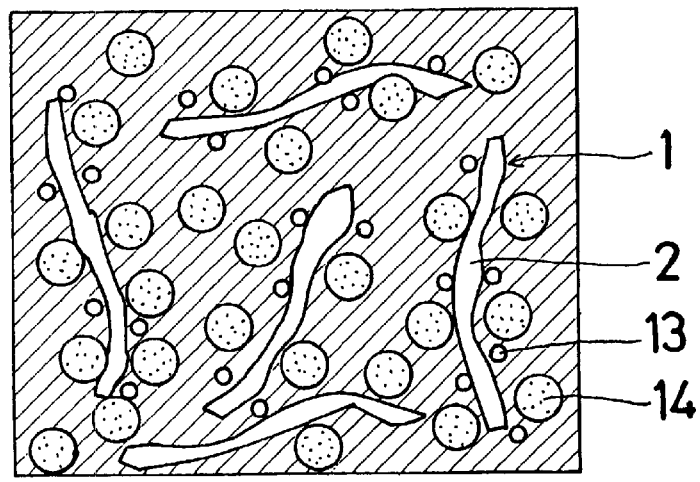
FIG. 1 is a schematic illustration of a dry friction material in accordance with an embodiment of the present invention showing the dispersion of composition materials and substrate fiber.

FIG. 1 is a schematic illustration showing the dispersion of substrate fiber and composition materials in a dry friction material in accordance with an embodiment of the present invention. As shown in FIG. 1, a substrate fiber 1 includes a trunk portion 2 extending in the axial direction of the substrate fiber 1 and divergent portions slightly diverged from parts of the trunk portion 2. In this embodiment, the maximum diameter of the trunk portion is about 10 to 20 μm and the length of the trunk portion is about 0.5 to 5 mm. The divergent portions can have cross-sections that are non-circular. The ratio of the maximum diameter of the cross-section to the minimum diameter of the cross-section can be greater than 2. By using this substrate fiber, it is possible to obtain a dry friction material having a superior coefficient of friction ($\mu$) without a complicated mixing process.

The substrate fiber can be manufactured by a method which includes a cutting process for cutting a filament or staple of aramid fibers to lengths of 10 to 50 mm, a pulverizing process for pulverizing the cut aramid fibers in a pulverizer, and a sorting process for sorting the aramid fibers having lengths of 0.5 to 5 mm. The filaments of the aramid fibers correspond to, e.g., long fiber for spinning and the staple of the aramid fibers corresponds to short fiber shorter than the filament.

It is desirable that the trunk portion of the substrate fiber has a curved shape. If the trunk portion of the substrate fiber has a curved shape, then the composition materials are apt to be taken in and be dispersed in the periphery of the substrate fiber. The meaning of "curved shape" does not include a straight shape, but does includes a bend shape, a spiral shape, a twisted shape and so on.

Figure 2:
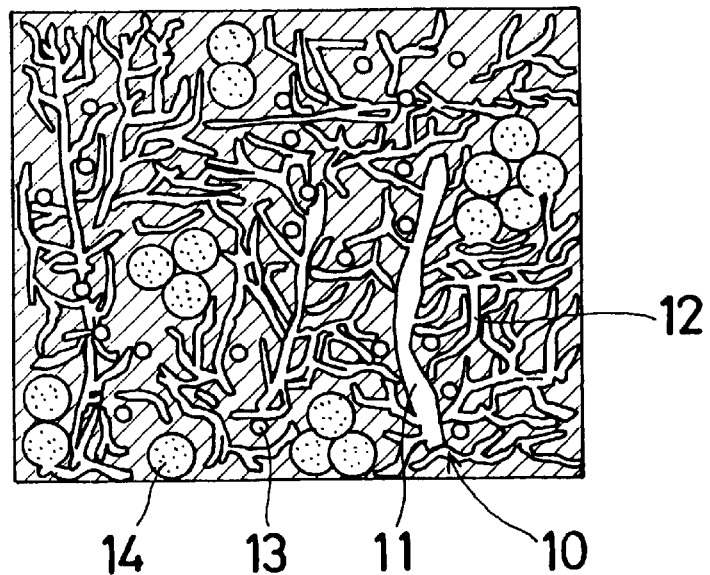
FIG. 2 is a schematic illustration of a dry friction material showing the dispersion of composition materials and substrate fiber including pulp of aramid fiber.
Figure 3:
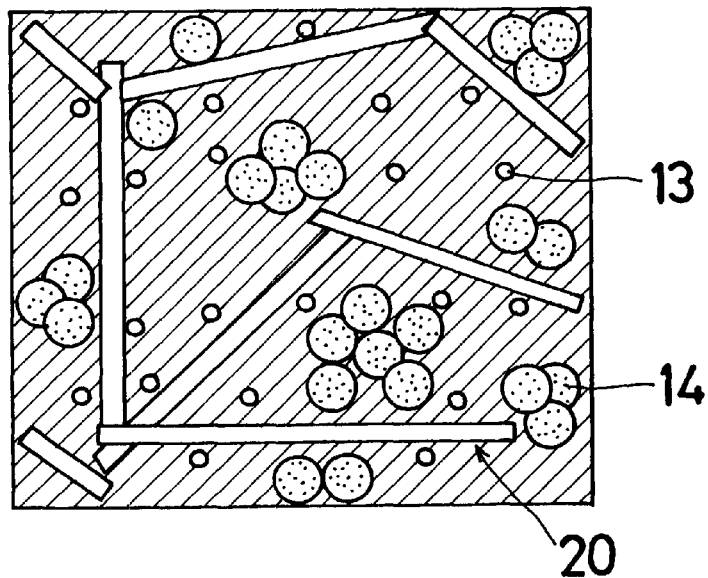
FIG. 3 is a schematic illustration of a dry friction material showing the dispersion of composition materials and substrate fiber including chops of aramid fiber.

The substrate fiber of the present invention is not limited to aramid fiber. However, it is preferable that the substrate fiber be aramid fiber having high strength. In the substrate fiber of the invention, since the divergent portions are only slightly diverged from a part of the trunk portion, the surface area per mass is relatively small in comparison with, e.g., the fiber pulp shown in FIG. 2. As a result, particles of composition materials are apt to approach the substrate fibers so that the composition materials and the substrate fibers can be dispersed equally or uniformly. Preferably, the substrate fiber is aramid fiber whose specific surface area is 0.5 to 3 $m^2/g$, more preferably 0.6 to 2 $m^2/g$.

Preferably the divergent portions form less than 10% of the area of the substrate fiber.

The dry friction material can include various composition materials in addition to the substrate fiber. The composition materials include, e.g., metal fiber, graphite, sulfuric barium and calcium hydroxide. Many other composition materials known in the art. Usually, more than ten different kinds of composition materials are compounded to form dry friction material. In addition to the substrate fiber and composition materials, resin (especially thermosetting resin) can be compounded to form the dry friction material. Suitable resins include, e.g., heat resistant resins such as phenolic resin and imide resin.

An embodiment of the invention will now be explained in more detail.

(1) Manufacture of a Test Material:

(a) Substrate fiber (aramid fiber), composition materials and resin (thermosetting resin: phenolic resin) as shown in Table 1 are compounded in the proportions shown in Table 1 and are mixed for 2 to 5 minutes in a mixer where the rotational speed of the chopper is 2000 to 4000 rpm and the rotational speed of the pan is 64 rpm. Then, the mixed materials are formed or molded in a molding die under a surface pressure of 10 to 50 Mpa, at a temperature of 150 to 200° C., for period of 3 to 10 minutes. The formed materials are then heated at 200 to 250° C. for 8 to 16 hours to obtain test materials having dimensions of 100 mm×40 mm×10 mm.

TABLE 1

| MATERIAL | VOLUME (%) |
|---|---|
| aramid fiber | 15 |
| cashew dust | 15 |
| resin | 20 |
| potassium titanate fiber | 10 |
| sulfuric barium | 30 |
| graphite | 5 |
| copper fiber | 3 |
| silicic acid zirconium | 2 |
| TOTAL | 100 |

Figure 4:
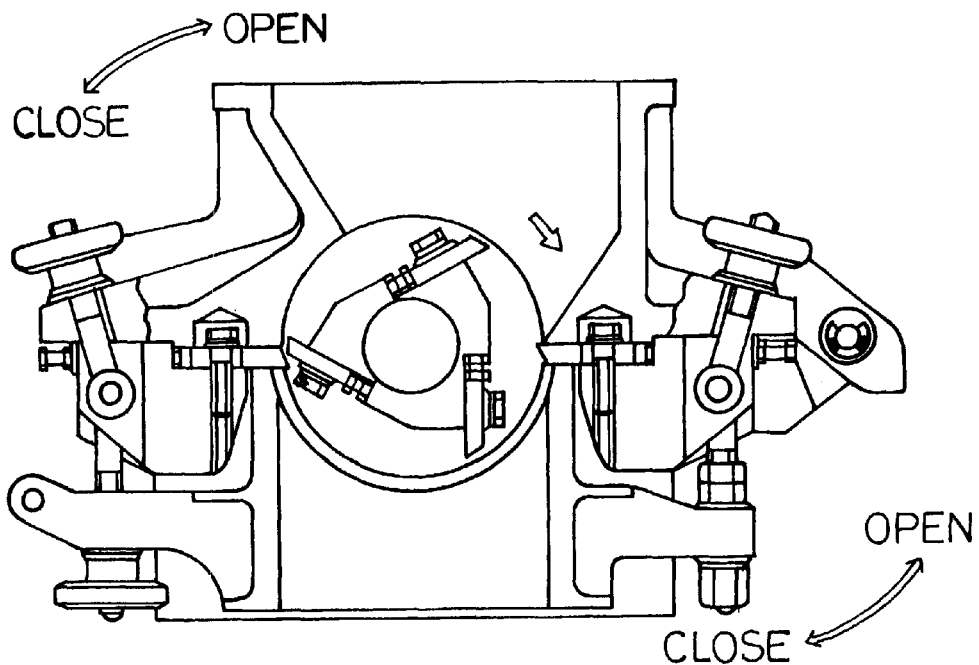
FIG. 4 is a schematic illustration of a one axis shearing pulverizer used for pulverizing aramid fibers in an embodiment of the present invention.

(b) The aramid substrate fiber used in Examples 1 to 3 of the embodiment in Table 4 is obtained by a cutting process and a pulverizing process. In the cutting process, filament or staple (diameter of the fiber is 10 to 20 μm) of aramid fibers is cut to length of 50 mm. In the pulverizing process, the cut filaments or staples are pulverized by a one axis shearing pulverizer as shown in FIG. 4. The pulverizer is driven by a four pole induction motor whose output is 5.5 kW (200 V). The pulverizing of the aramid fibers is performed under a rotational speed of 835 rpm. The clearance between the rotational cutter and the fixed cutter is 0.3 mm. The pulverized aramid fiber is sorted by a screen of 1 to 5 mm and the size of the substrate fiber is adjusted.

(c) In Comparative Examples 1 and 2 in Table 4, pulp of aramid fiber is used as the substrate fiber. In Comparative Examples 3 and 4 in Table 4, chops of aramid fiber is used as the substrate fiber. In the Comparative Example 5 in Table 4, aramid fiber based on the present invention is used as the substrate fiber but the length of the fiber is longer that 5 mm. As shown in Table 4, the lengths of the substrate fibers used as the comparative examples are different. In Example 1–3 of the embodiment, filament or staple of aramid fiber whose diameter is 10 to 20 μm and whose length is not fixed is used as the raw material. In Comparative Examples 1–5, a general commercial material (such as cabler of dupon) is used.

(2) Friction Test

The friction test is performed by an inertia type frictional wear tester. In this test, a rotational disc whose material is FC200 and whose surface roughness is lower than 2.0 z is used. The conditions of the friction test are shown in Table 2 and Table 3.

TABLE 2

| (condition of friction) | |
|---|---|
| Temperature of disc before engagement (° C.) | 120 |
| Push load (N) | 400 |
| Frequency of engagement | 1000 |
| Peripheral velocity (m/s) | 5 |

TABLE 3

(specification of friction test)

| | |
|---|---|
| Sliding diameter (mm) | 32 |
| Wind velocity (m/s) | 11 |
| Inertia (kg · m$^2$) | 0.25 |
| Area of friction material (cm$^2$) | 3.9 |

(3) Evaluation Method

The effect of substrate fiber and substrate fiber length in Examples 1 to 3 and Comparative Examples 1 to 5 is evaluated as follows.

(a) Dispersibility

As an index showing the dispersibility between the substrate fiber and the composition materials, the difference of hardness in the friction surface of each test material is measured twenty times and the evaluation is performed on the basis of the average of the difference of hardness. Table 4 shows the result of the evaluation. The hardness is measured using a Rockwell hardness meter at five points of each test material and the difference of hardness is a difference between the maximum value and the minimum value. In the dispersibility in Table 4, ○ shows that the substrate fibers having equal or uniform size exist as a whole. On the contrary, X shows that the substrate fibers generate mass or bank partly.

Figure 5:
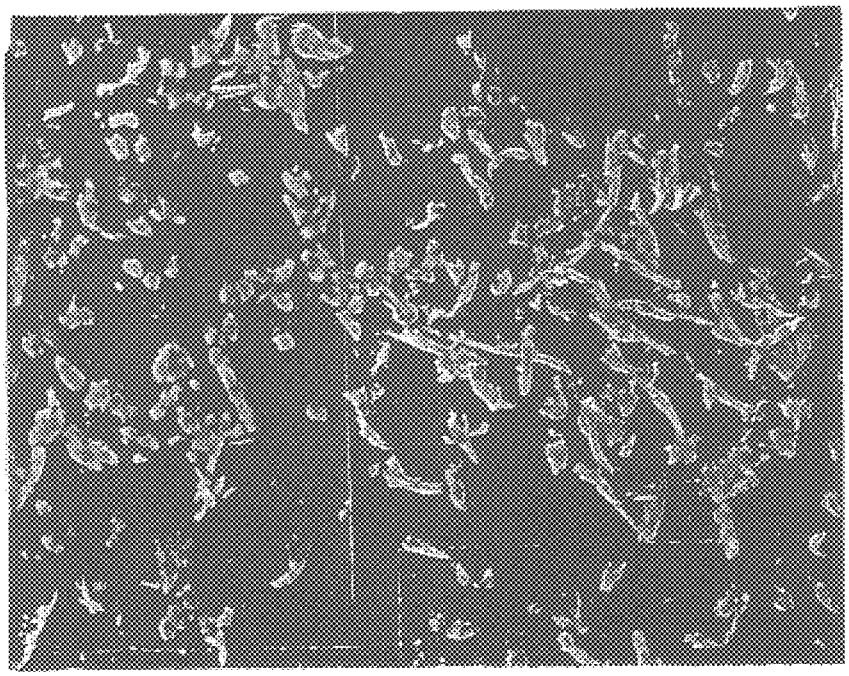
FIG. 5 is a fluorescence microscope photograph obtained by irradiating a substrate fiber of an embodiment of the present invention with ultraviolet radiation.
Figure 6:
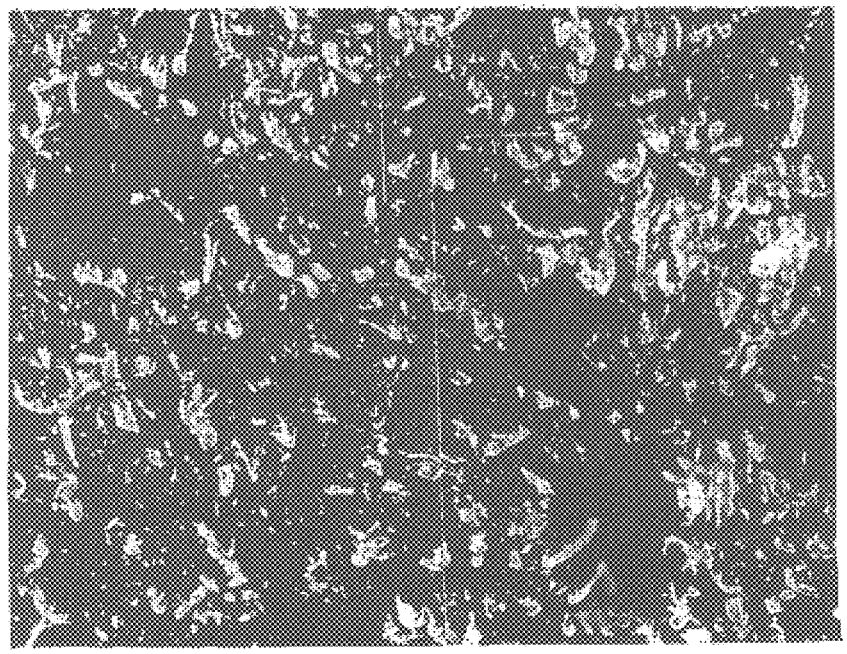
FIG. 6 is a fluorescence microscope photograph obtained by irradiating a substrate fiber of a comparative example with ultraviolet radiation.

Further, the distribution of the fiber in Example 1 and Comparative Example 2 is observed using a fluorescence microscope while irradiating ultraviolet rays and the results of the observation are shown in FIG. 5 (Example 1) and FIG. 6 (Comparative Example 2). The observation by the fluorescence microscope is performed with respect to 10 views (2.5 mm×5.0 mm) while using UV-2 A filter. The basis of the observation is the center of the friction surface of each test materials.

(b) The influence of the history of friction

The change of the condition on the friction surface of each test material due to the history of friction is observed as follows. At first, the engagement is performed fifty times and this condition after engagement is set as the initial condition. Then, the engagement is performed thousand times, and the change on the friction surface, namely the changing rate of the area of the fibers is observed. The result of this observation is shown in Table 4.

The image processing is performed on the friction surface of each of the test materials and the changing rate of the area of the fibers is obtained as an average of 10 views. The changing rate of the area of the fibers shows that the friction surface is not influenced very much by the history of friction and that the friction surface is stable if the changing rate of the area of the fibers is closer to 1. In Table 4, "↑" shows the increase of the changing rate of the area of the fibers and "↓" shows the decrease of the changing rate of the area of the fibers.

(c) Change of coefficient of friction ($\mu$)

The change of friction is evaluated by the variation of the torque on the friction surface of each of the test materials influencing the stick slip. Concretely, the variation data of torque during an engagement (more than 80% of the target push load) which is sampled at 50 msec cycle after fifty times engagement and thousand times engagement is statistically treated and the standard deviation is used as an index. It is desirable that the torque variation deviation is smaller than 1. Further, "more than 80% of the target push load" means that the hydraulic pressure reaches the value more than 80% of the target hydraulic pressure when the friction surface of each test materials is pushed onto the surface of the rotational axis of the tester under the predetermined target hydraulic pressure (target push load). The torque variation data shows a variation of axial torque of the rotational axis after the target hydraulic pressure becomes more than 80%.

(4) Total Judgment (a) As shown in Table 4, when the dispersibility, the changing rate of the area of the fibers and the torque variation deviation are totally judged, Examples 1 to 3 are superior. In the total judgment in Table 4, ○ shows that the torque variation deviation is smaller than 1 and that the changing rate of the area of the fibers is small. Δ shows that the changing rate of the area of the fibers is small but the torque variation deviation is larger than 1. X shows that the changing rate of the area of the fibers is large.

TABLE 4

| Feature | | | Example 1 | Example 2 | Example 3 | Comp. Example 1 | Comp. Example 2 | Comp. Example 3 | Comp. Example 4 | Comp. Example 5 |
|---|---|---|---|---|---|---|---|---|---|---|
| Feature | Kind of fiber | | Invention | Invention | Invention | Pulp | Pulp | Chop | Chop | Invention |
| | Fiber's length (mm) | | 1 | 3 | 5 | 0.8 | 2 | 6 | 13 | 10 |
| Manufacturing | Difference of hardness (Rockwell S scale) | | 4 | 7 | 10 | 17 | 20 | 25 | 45 | 27 |
| | Dispersibility | | ○ | ○ | ○ | ○ | ○ | x | x | x |
| Performance | Changing rate of area of fibers engagement 50 → 1000 times | | 1.03↑ | 1.02↑ | 1.07↑ | 1.73↑ | 1.98↑ | 0.96↓ | 0.89↓ | 0.82↓ |
| | Torque variation deviation at an engagement | engagement 50 times | 0.3 | 0.5 | 0.7 | 0.9 | 0.8 | 1.2 | 1.6 | 1.0 |
| | | engagement 1000 times | 0.5 | 0.8 | 1 | 2.2 | 2.4 | 1.6 | 1.7 | 1.2 |
| | | Total judgment | ○ | ○ | ○ | x | x | x | x | x |

Figure 7A:
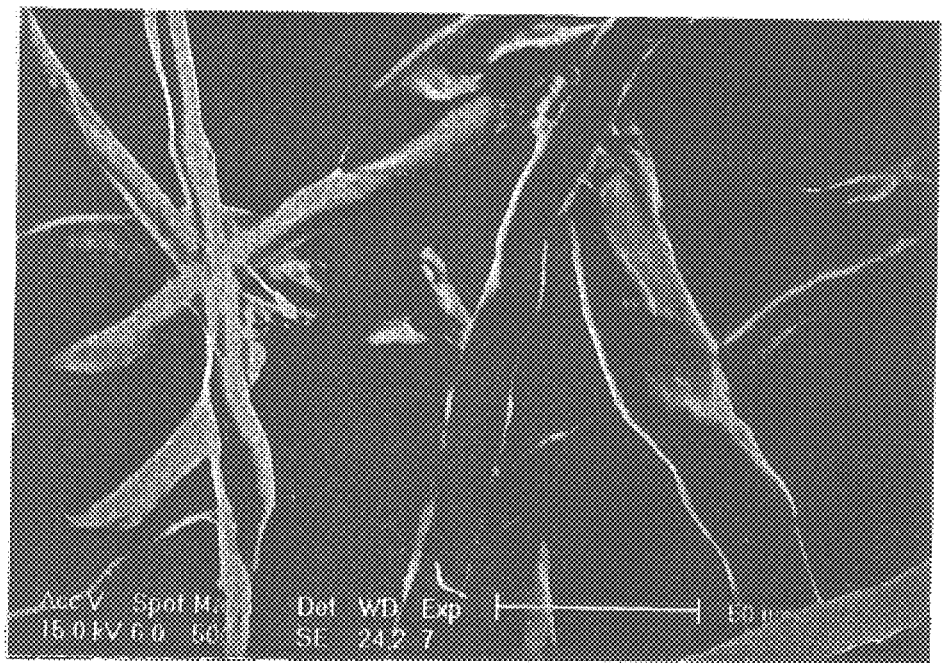
FIG. 7a is a 500× scanning electron microscope (SEM) photograph of a substrate fiber of an embodiment of a present invention.
Figure 7B:
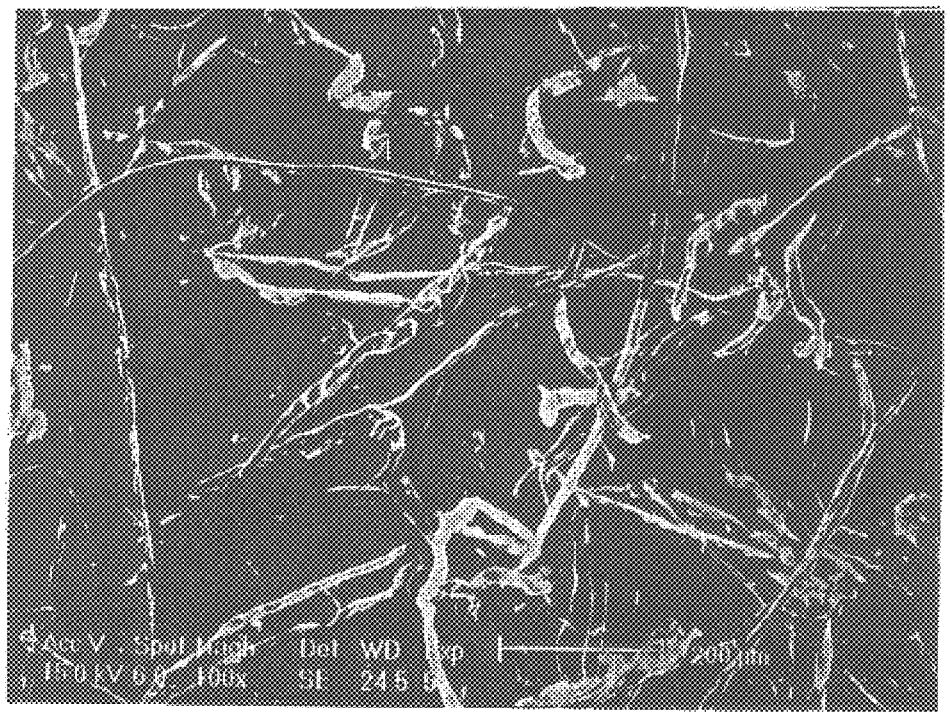
FIG. 7b is a 100× scanning electron microscope (SEM) photograph of a substrate fiber of an embodiment of a present invention.
Figure 8A:
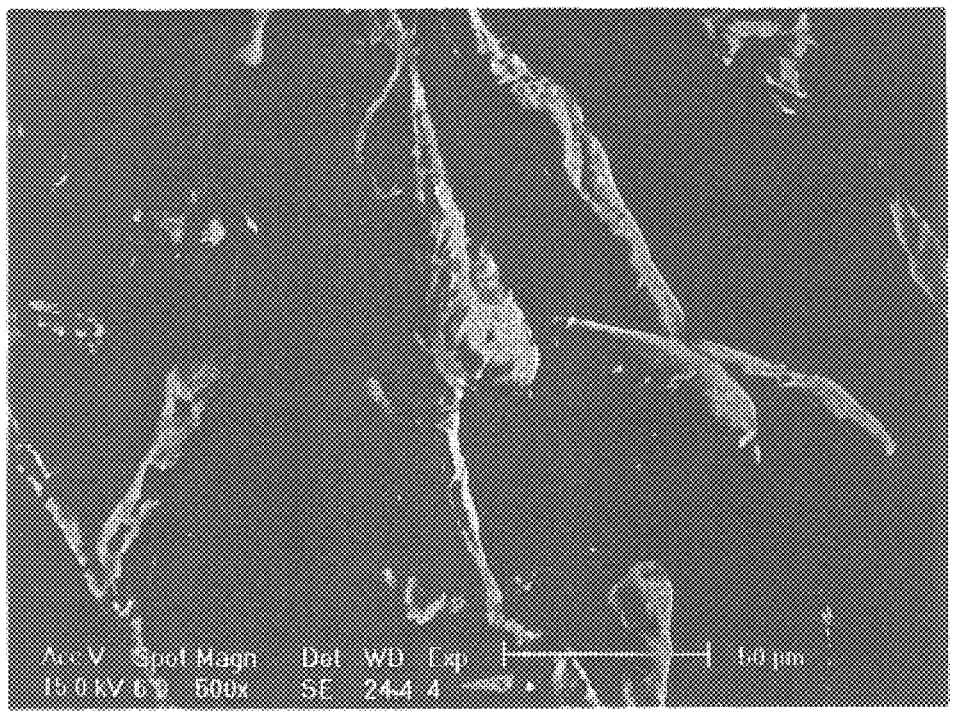
FIG. 8a is a 500× scanning electron microscope (SEM) photograph of a substrate fiber of a comparative example.
Figure 8B:
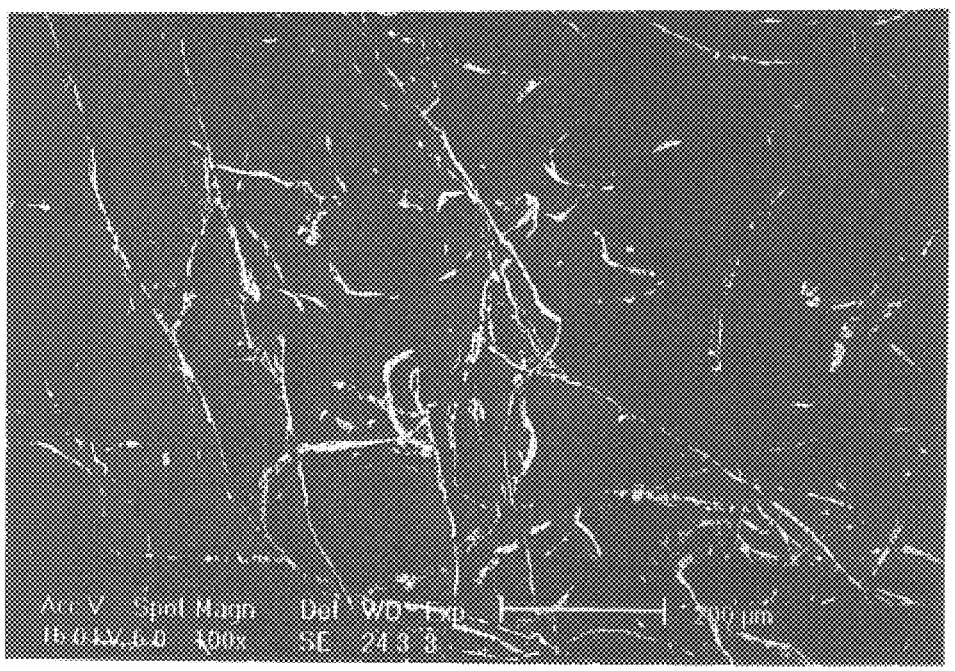
FIG. 8b is a 100× scanning electron microscope (SEM) photograph of a substrate fiber of a comparative example.

Index of judgment
{Manufacturing/Dispersibility}
○ existence of equal size as a whole
x existence of mass partly
{Performance}
Changing rate of area of fibers: the closer to 1 the friction surface is stable
↑ increase of area
↓ decrease of area
Total judgment
○ Torque variation deviation <1, changing rate of area is small
Δ changing rate of area is small, torque variation deviation >1
x changing rate of area is large (b) Photographs of the aramid fibers according to the embodiment of the invention and of the aramid fiber pulp which were observed using a scanning electron microscope (SEM) under an acceleration voltage 15 kV are shown in FIGS. 7a, 7b, 8a and 8b. FIGS. 8a and 8b clearly show that numerous divergent portions are generated in the substrate fiber forming the aramid fiber pulp. On the other hand, FIGS. 7a and 7b show that in the substrate fiber of the embodiment of the present invention, divergent portions are formed from only parts of the trunk portions. In addition, FIGS. 7a and 7b show trunk portions that have a suitably curved shape.

Finally, the Table 5 shows a comparison of the specific surface area among the substrate fibers (Sample Nos. 1 and 2) according to the invention, fiber pulp material (Sample No. 3) and chop material (Sample No. 4). Sample No. 1 is formed by directly pulverizing the filament of the aramid fibers. Sample No. 2 is formed by pulverizing the filament of the aramid fibers after carding. Sample Nos. 1 and No. 2 correspond to the above mentioned Examples, Sample 3 corresponds to the above mentioned Comparative Examples 1 and 2, and the Sample 4 corresponds to the above mentioned Comparative Examples 3 and 4.

In Table 5, the specific surface area is measured using a BET isotherm method with nitrogen gas used as the adsorption gas. During the measurement, the samples are heated to 120°C. for more than 120 minutes as an initial heat treatment. In addition, the exhaust time under the vacuum is 1 minute and the exhaust velocity under the vacuum is 300 mm Hg/min. The modes of the measurement are wafting mode with balancing. The time of balancing is 5 second. The sample cell is flask type cell (about 6 cc). The weight of the samples are in the range of 0.4767 to 0.6176 g.

As shown in Table 5, since the substrate fiber according to the embodiment has suitable divergent portions, the specific surface area of the substrate according is larger than that of chops but is smaller than that of the pulp.

TABLE 5

| Sample No. | the specific surface area (m²/g) | | Note |
|---|---|---|---|
| | First time | Second time | |
| 1 | 0.68 | 0.70 | Invention |
| 2 | 0.97 | 1.00 | Invention |
| 3 | 6.37 | 6.40 | pulps |
| 4 | 0.53 | 0.53 | chops |

The disclosure of the priority document, Japanese Patent Application 2000-365710, filed Nov. 30, 2000, is incorporated by reference herein in its entirety.

While the present invention has been described with respect to specific embodiments, it is not confined to the specific details set forth, but includes various changes and modifications that may suggest themselves to those skilled in the art, all falling within the scope of the invention as defined by the following claims.

What is claimed is:

1. A substrate fiber for a dry friction material, the substrate fiber comprising a trunk portion extending in an axial direction of the substrate fiber and having a maximum diameter and a length; and at least one divergent portion diverged from a part of the trunk portion and having a diameter less than the maximum diameter, wherein
the maximum diameter is in a range from 10 to 20 $\mu$m,
the length of the trunk portion is in a range from 0.5 to 5 mm, and
the substrate fiber is an aramid fiber with a specific surface area of 0.5 to 3 m²/g.

2. The substrate fiber according to claim 1, wherein the trunk portion has a curved shape.

3. The substrate fiber according to claim 1, wherein the substrate fiber is an aramid fiber with a specific surface area of 0.6 to 3 m²/g.

4. The substrate fiber according to claim 1, wherein the at least one divergent portion forms less than 10% of the surface area of the substrate fiber.

5. A method of making a substrate fiber, the method comprising cutting aramid fiber into fiber segments;

pulverizing the fiber segments; and producing the substrate fiber of claim 1.

6. A method of using a substrate fiber, the method comprising mixing the substrate fiber of claim 1 with a resin; and producing a dry friction material.

7. The method according to claim 6, wherein the resin is selected from the group consisting of phenolic resin and imide resin.

* * * * *